US009535921B2

(12) United States Patent
Bubash et al.

(10) Patent No.: US 9,535,921 B2
(45) Date of Patent: *Jan. 3, 2017

(54) AUTOMATIC MEDIA NAMING USING FACIAL RECOGNITION AND/OR VOICE BASED IDENTIFICATION OF PEOPLE WITHIN THE NAMED MEDIA CONTENT

(71) Applicant: INTERNATIONAL BUSINESS MACHINES CORPORATION, Armonk, NY (US)

(72) Inventors: Tanya E. Bubash, Grapevine, TX (US); Gregory P. Fitzpatrick, Keller, TX (US); Romelia H. Flores, Keller, TX (US); Endemecio Santana, Dallas, TX (US); Tassanee K. Supakkul, Euless, TX (US); Janki Y. Vora, Dallas, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,300

(22) Filed: Jul. 3, 2015

(65) Prior Publication Data
US 2015/0310028 A1 Oct. 29, 2015

Related U.S. Application Data

(63) Continuation of application No. 13/826,348, filed on Mar. 14, 2013, now Pat. No. 9,104,683.

(51) Int. Cl.
G06F 17/30 (2006.01)

(52) U.S. Cl.
CPC ............... *G06F 17/30123* (2013.01)

(58) Field of Classification Search
CPC ............ G06F 17/30123; G06F 17/30265; G06F 17/3028
USPC .................. 707/737, 745, 748, 822, 823
See application file for complete search history.

(56) References Cited

U.S. PATENT DOCUMENTS

| 6,988,088 | B1 | 1/2006 | Lipscher et al. |
| 7,395,216 | B2 | 7/2008 | Rosenfeld et al. |
| 2005/0261941 | A1 | 11/2005 | Scarlat et al. |
| 2008/0235049 | A1 | 9/2008 | Morita et al. |
| 2009/0070138 | A1 | 3/2009 | Langheier et al. |
| 2010/0070300 | A1 | 3/2010 | Anderson et al. |
| 2010/0179930 | A1 | 7/2010 | Teller et al. |
| 2011/0077964 | A1 | 3/2011 | Janevski et al. |
| 2011/0225002 | A1 | 9/2011 | Fackler et al. |

(Continued)

Primary Examiner — M D. I Uddin
(74) Attorney, Agent, or Firm — Yakov Sidorin; Quarles & Brady LLP

(57) ABSTRACT

A computing device identifies a plurality of media files within a data store, each of the media files lacking user established file names. The computing device analyzing the plurality of media files to recognize humans in the media files based on facial recognition and/or voice recognition programs. Using results of the analyzing to generate a plurality of content identification keywords, which are scored and ranked. Establishing a filename prefix for the media files using scored and ranked content identification keywords. Automatically generating a unique file name for each of the media files, wherein each unique file name includes the established filename prefix.

20 Claims, 7 Drawing Sheets

(56) References Cited

U.S. PATENT DOCUMENTS

2012/0203871 A1\* 8/2012 Svendsen ............... G06F 15/16
709/219

\* cited by examiner

AUTOMATIC MEDIA NAMING USING FACIAL RECOGNIZATION AND/OR VOICE BASED IDENTIFICATION OF PEOPLE WITHIN THE NAMED MEDIA CONTENT

CROSS-REFERENCE TO RELATED APPLICATIONS

This continuation application claims the benefit of U.S. patent application Ser. No. 13/826,348 filed 14 Mar. 2013 entitled "Enabling Intelligent Media Naming and Icon Generation Utilizing Semantic Metadata." The entire contents of U.S. application Ser. No. 13/826,348 are incorporated by reference herein.

BACKGROUND

The present invention relates to the field of media and, more particularly, to enabling intelligent media naming and icon generation utilizing semantic metadata.

In today's digital world, many types of devices can produce a variety of media which can lead to substantial amounts of generated media files. For example, a mobile phone can allow a user to take pictures, record movies, and music which can be stored on the mobile phone as media files. The media content can quickly become disorganized and/or difficult to manage due to the generic automated naming generation capabilities of devices. Consequently, retrieval and reuse of this generated media can be hindered by cryptic filenames, incorrectly named files, and/or misleading icons.

Traditionally, media capture devices often name media files in an alphanumeric value combination and maintain a progression order. For example, the first image file of a camera is often labeled (e.g., IMG_0001) with number values of the filename are incremented for each subsequent picture (e.g., IMG_0002). These file names do not provide much information and lack the ability to give meaningful naming to the media files. Currently, organization methods require manual processes to be completed by device owners to give media files generated meaningful names. For example, the media file has to be inspected and named manually. That is, media files must be renamed individually or folders must be created to group multiple files together based on their relevancy. Such known solutions are tedious, unintuitive, time consuming, and failure ridden.

BRIEF SUMMARY OF THE DISCLOSURE

One aspect of the present disclosure can include a method, system, and/or computer program product where a computing device identifies a plurality of media files within a data store, each of the media files lacking user established file names, lacking user established icons, or lacking user established file names and icons. The computing device analyzing the plurality of media files to determine semantic metadata using semantic analysis processes. For at least a subset of the media files, the semantic metadata is used to automatically generate unique and meaningful file names, file icons, or both file names and file icons for each of the media files in the subset. The computing device establishes a filename prefixes from the semantic metadata and concatenates the filename prefix and unique filename suffix to create a unique filename for the subset of media files.

Another aspect of the present disclosure can include a method for enabling intelligent media naming and icon generation utilizing semantic metadata. One or more media files within a data store can be identified. The media files can include a filename and a file icon. The files can be an image file, a video file, an audio, or a document file. The media files can be semantically analyzed to determine semantic metadata. The semantic metadata can include a content identification keyword, an explicit relationship, or an implicit relationship. A filename and a file icon can be generated associated with the media files from the semantic metadata.

Another aspect of the present disclosure can include a system for enabling intelligent media naming and icon generation utilizing semantic metadata. A naming engine can be configured to generate a filename and an icon associated with semantic metadata of a media file. The media file can be an image file, a video file, an audio, or a document file. The semantic metadata can be a content identification keyword, an explicit relationship, or an implicit relationship. A data store can persist a media file, a customization profile, semantic metadata associated with the media file, or a semantic ruleset. The semantic ruleset can control the generation of the filename and/or icon.

Yet another aspect of the present disclosure can include a computer program product that includes a computer readable storage medium having embedded computer usable program code. The computer usable program code can be configured to select a media file within a data store, wherein the media file is at least one of an image, a video, an audio, and a document. The computer usable program code can analyze the media file to determine semantic metadata associated with the media file. The semantic metadata can be a content identification keyword, an explicit relationship, or an implicit relationship. The computer useable program code can create an alias file, wherein the alias file comprises of a reference to the media file, wherein at least one of the filename and the icon of the alias file is determined from the semantic data associated with the media file.

DETAILED DESCRIPTION OF EMBODIMENTS OF THE DISCLOSURE

Figure 1A:
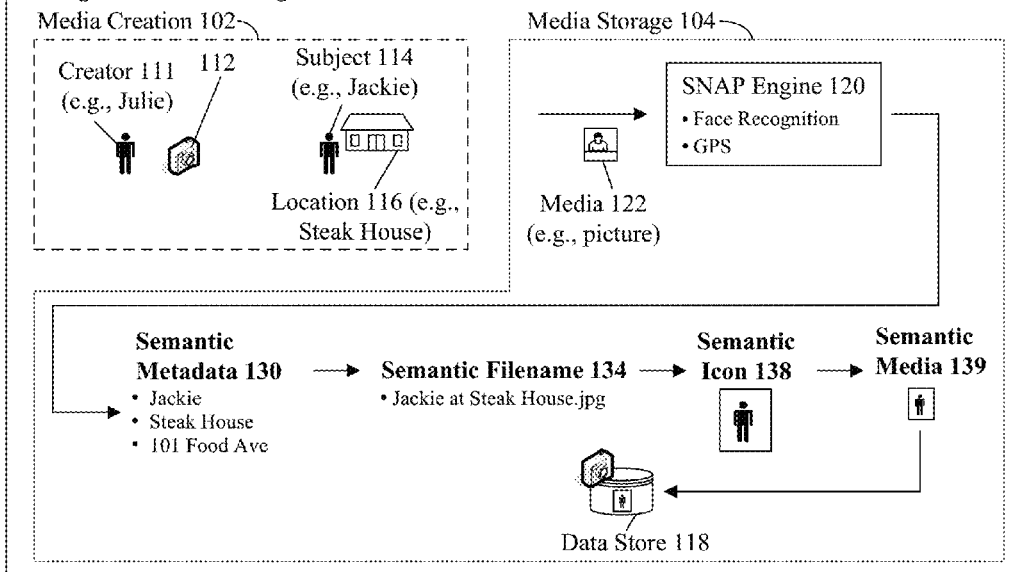
FIG. 1A is a schematic diagram illustrating a set of scenarios for enabling intelligent media naming and icon generation utilizing semantic metadata in accordance with an embodiment of the inventive arrangements disclosed herein.
Figure 1A:
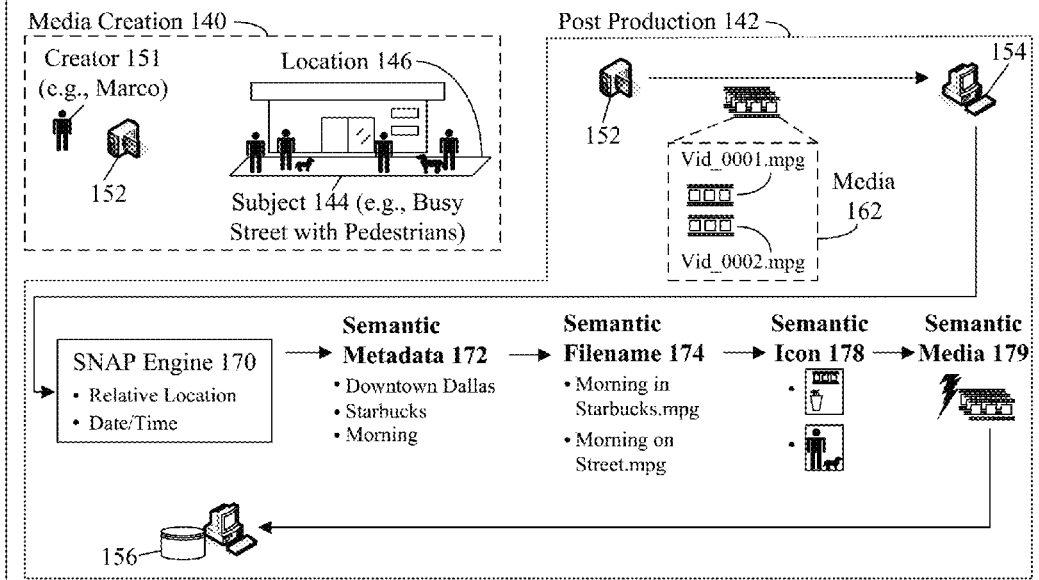

The present disclosure is a solution for enabling intelligent media naming and icon generation utilizing semantic metadata. In the solution, semantic metadata associated with a media file can be utilized to organizing and/or name media files. Semantic metadata can be determined during media creation and/or during post production. Semantic metadata can be obtained utilizing traditional and/or proprietary techniques including, but not limited to, image recognition, voice recognition, event recognition, and the like. Semantic metadata can be utilized to name the media file and/or generate a meaningful icon associated with the media file. For example, a picture of a Dave at a Jen's birthday party can be analyzed to determine an event and a person of interest resulting in the picture being automatically named "Dave at Jen's Birthday Party.jpg". That is, the disclosure can leverage semantic data to assign and associate meaningful names to media data automatically and facilitate searching on content.

As will be appreciated by one skilled in the art, aspects of the present invention may be embodied as a system, method, downloadable device app, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. The program code may also execute at least in part on a smart phone, tablet, gaming console, smart consumer electronic device, or embedded device. In a hybrid processing scenario where program code executes partially on a client and partially on at least one remote computers, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is a schematic diagram illustrating a set of scenarios 110, 150 for enabling intelligent media naming and icon generation utilizing semantic metadata in accordance with an embodiment of the inventive arrangements disclosed herein. Scenarios 110, 150 can be present in the context of scenario 180, method 200, system 300, embodiment 410, 420 diagram 510, and/or interfaces 610, 630. In scenario 110, 150, media 122, 162 can be intelligently named utilizing semantic metadata 130, 172. Semantic metadata 130, 172 can be obtained by engine 120, 170 via one or more traditional and/or proprietary semantic analysis processes. For example, semantic metadata can be obtained through facial recognition of persons in a picture. Metadata 130, 172 can be utilized to determine filename 134, 174 and/or icon 138, 178. That is, the disclosure can facilitate meaningful naming and/or presentation of media 122, 162.

As used herein, media 122, 162 can be a digital content associated with a computing device (e.g., camera 112, 152). Media 122, 162 can include, but is not limited to, an image, a video, an audio, a document, and the like. Media 122, 162 can include one or more combinations of images, video, audio, documents, and the like. Media 122, 162 can be associated with a filename, an icon, a file system path, an owner, an author, a computing device, a permissions setting, and the like. Media 122, 162 can be associated with logical groupings including, but not limited to, a collection, a set, and the like. In one embodiment, the disclosure can be utilized to rename a collection of images within a slideshow application.

As used herein, semantic metadata 130, 172 can be a data set associated with media 122, 162. Metadata 130, 172 can include, but is not limited to, a semantic filename (i.e. an alias), a semantic icon (i.e. an alternate icon), presence data, content identification data (e.g., tags, attributes), and the like. Metadata 130, 172 can be obtained from one or more internal and/or external data sources. For example, a semantic repository can be utilized to obtain metadata 130 associated with a media 122. Metadata 130, 172 can be persisted within devices 112, 152 within a peripheral communicatively linked to devices 112, 152, and/or within an external repository (e.g., cloud). In one instance, metadata 130, 172 can be associated with an ontology, a dictionary, a metadata hierarchy, and the like.

Scenario 110 can include a media creation portion 102 and a media storage portion 104. In media creation portion 102, a creator 111 can create a media 122 of a subject 114 at a location 116 using camera 112. For example, Julie can take a picture of her friend Jackie in front of a steak house after a dinner at the steak house. In media storage portion 104, media 122 can be appropriately named (e.g., Jackie at Steakhouse.jpg) using semantic metadata and stored within camera 112 data store 118. That is, the disclosure can permit semantic naming and icon generation during media 122 creation based on content within media, participant relationships, and the like.

The media 122 can be conveyed to a Smart Naming and Analyzing Process (SNAP) engine 120. In one instance, the engine 120 can be a firmware program within camera 112. For example, engine 120 can be a component of a file storage driver of camera 112. Media 122 can be analyzed utilizing one or more semantic analysis techniques. For example, engine 120 can leverage face recognition algorithms and Global Positioning System data to establish a picture of Jackie was taken at a steak house on "101 Food Avenue". The metadata 130 can be utilized to generate semantic filename 134 of media 122. For example, filename 134 can be set to "Jackie at Steak House.jpg". Metadata 130 can be utilized to generate a relevant semantic icon 138 for media 122. For example, icon 138 can be a portrait of Jackie which can be utilized for rapid identification of the subject (e.g., 114) of media 122 within a file manager application interface. Upon creation of filename 134 and/or icon 138, the media 122 can be stored as a semantic media 139 within data store 118.

In one instance, filename 134, icon 138 can be generated by determining inherent relationships between semantic metadata. For example, engine 120 can determine that Julie and Jackie are friends and can create a filename 134 "My friend Jackie.jpg" for media 122. In one embodiment, engine 120 can leverage social networking data to determine relevant semantic metadata. For example, engine 120 can utilize FACEBOOK to determine the identity and relationship of people within a picture. It should be appreciated that semantic metadata 130 can include explicit relationship data, user provided metadata, and the like.

Scenario 150 can include a media creation 140 and a post production 142 portion. In media creation portion 140, a creator 151 can create media 162 of subject 144 using video camera 152. For example, media 162 can include two video samples automatically named by camera 152 as "Vid_0001.mpg" and "Vid_0002.mpg". In post production portion 142, media 162 can be conveyed to a computing device 154. For example, camera 152 can be connected to computer 154 which can permit downloading of media 162 to computer 154 hard drive. Media 162 can be conveyed to a SNAP engine 170 which can obtain semantic metadata 172 from media 162. In one instance, SNAP engine 170 can be a functionality of a video manipulation/management application (e.g., ADOBE PREMIER). In one embodiment, engine 170 can perform one or more traditional and/or proprietary analysis of media 162 during post production 142. Engine 170 can perform a semantic analysis of media 162 to extract semantic metadata 172. For example, engine 170 can utilize the relative location (e.g., downtown Dallas) and/or date and time (e.g., morning) information to determine relevant metadata 172. Metadata 172 can be utilized to generate an appropriate semantic filename 174 and a semantic icon 178 for each media (e.g., Vid_0001, Vid_0002). For example, metadata 172 can be utilized to generate a filename "Morning in Starbucks.avi" with an icon of a Starbucks logo for the first media (e.g., Vid_0001) and a second filename "Morning on Street.avi" with an icon of people on a street for the second media (e.g., Vid_0002).

In one instance, analysis and renaming of media 162 can be performed during media 162 transfer (e.g., import action). In another embodiment, analysis and renaming of media 162 can be performed during a post production management (e.g., editing workflow).

It should be appreciated that semantic filename 134, 174 and/or icon 138, 178 can be modified by a user permitting correction of filename selection. Engine 120, 170 can include an auto-learning module which can over time improve content naming based on feedback and self-learning.

It should be appreciated that the semantic filename 134, 174 and/or semantic icon 138, 178 can correspond to the media 122, 162 filename and/or icon. That is, media 122, 162 can be renamed to filename 134, 174 and an associated icon can be changed to icon 138, 178. For example, during scenario 110, media 122 can be persisted in a temporary volatile memory (e.g., cache) using a temporary filename (e.g., randomly generated filename) which can be changed when the media 122 is persisted within a permanent non-volatile storage (e.g., data store 118) as media 139.

Drawings presented herein are for illustrative purposes only and should not be construed to limit the invention in any regard. It should be appreciated that the disclosure is not limited to the scenario 110, 150 and can be utilized during media management processes (e.g., library organization), an import/export action, and the like. In one embodiment, the disclosure can utilize embedded data to determine semantic metadata. In the embodiment, data can include, but is not limited to, a graphic, a chart, a graph, an image, an audio, a video, a text element, a structured document, an unstructured document, and the like. It should be appreciated that engine 120, 170 can be similar or identical to a naming engine 320.

Figure 1B:
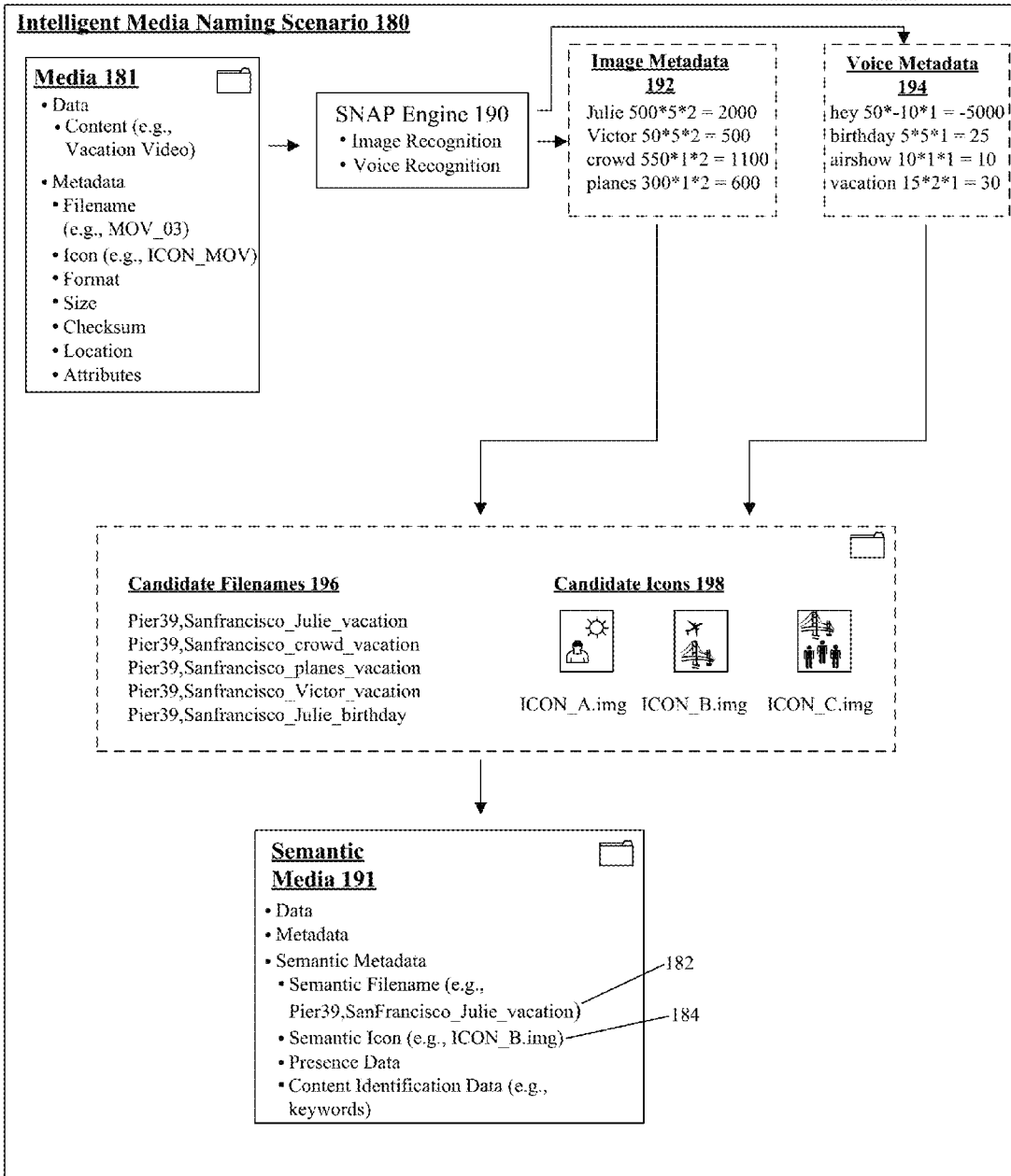
FIG. 1B is a schematic diagram illustrating a scenario for enabling intelligent media naming and icon generation utilizing semantic metadata in accordance with an embodiment of the inventive arrangements disclosed herein.

FIG. 1B is a schematic diagram illustrating a scenario 180 for enabling intelligent media naming and icon generation utilizing semantic metadata in accordance with an embodiment of the inventive arrangements disclosed herein. Scenario 180 can be present in the context of scenario 110, 150, method 200, system 300, embodiment 410, 420, diagram 510, and/or interfaces 610, 630. In scenario 180, a media 181 can include data and/or metadata which can be utilized to associate semantic media data 191 to the media 181. For example, media 181 can be a video of a vacation holiday which can be labeled meaningfully by utilizing image and voice recognition technologies. In one instance, media 191 can include semantic filename 182, semantic icon 184, presence data, content identification data, and the like. In the instance, filename 182 can include multiple filenames (e.g., candidate filenames 196) and icons 184 can include multiple icons (e.g., candidate icons 198). For example, media 191 can have several alias names (e.g., 196) which can be selected by a user based on user preference.

It should be appreciated that filename/icon generation can be dependent on any combination of semantic analysis processes (e.g., image recognition, voice recognition). For example, candidate icons 198 can be generated utilizing both image metadata 192 and voice metadata 194.

SNAP engine 190 can process media 181 to determine semantic metadata 192, 194. In one embodiment, metadata 192, 194 can include a keyword (e.g., tag) and attributes which can be evaluated to determine keyword relevancy. That is, utilizing attributes associated with a keyword can permit the association of meaningful keywords and the disassociation of non-meaningful keywords to the media. Attributes can include, but is not limited to a frequency value, a weighting value, a priority value, and the like. For example, engine 190 can utilize image recognition to determine a keyword such as Julie having a frequency of five hundred, a weighting of five, and a priority of two which can total to a value of two thousand. Attributes can be calculated utilizing one or more traditional and/or proprietary mechanisms. For example, a frequency value can be determined by how many times a person appears in a portion of a video sample.

In one embodiment, frequency, weighting, and/or priority values can be computed to determine a score which can be utilized to rank keywords in order of significance. For example, when the keyword (e.g., Julie) score (e.g., two thousand) is above a threshold value (e.g., one thousand), the keyword can be ranked up, and when the keyword (e.g., Victor) score (e.g., five hundred) is below the threshold value, the keyword can be ranked down. It should be appreciated that the score can be computed utilizing arbitrarily complex algorithms. For example, score can be an average of each attribute or can be a value computed utilizing one or more mathematical formulas.

In one instance, keywords from each metadata 192, 194 set (e.g., Julie, vacation) which have the highest values can be selected to be utilized during candidate filename 196 generation and/or icon 198 creation. For example, a photo taken by Julie in San Francisco on vacation at Pier 39 can be appropriately named "Pier39,SanFrancisco_Julie_vacation" (e.g., 182) presented as icon ICON_B (e.g., 184).

In one embodiment, engine 190 can utilize a prefix/suffix filename construction to intelligently name media 181. In the embodiment, semantic metadata (e.g., tags) having the greatest significance can be utilized as a prefix (e.g., Pier 39) for a filename and each successive metadata can be appended. It should be appreciated that metadata quantity can be arbitrarily limited based on user preference, file system limitations, and the like. For example, a user can establish that the three most significant keywords "Pier39, SanFranciso", "Julie", "vacation" can be utilized to create a filename 182.

In one embodiment, candidate 196 can be utilized to present a user specific filename for media. In the embodiment, the user identity can be utilized to determine an appropriate filename/icon for media 191 (e.g., based on historic selection, user relationship to media, etc). For example, when Victor views media 191 within a file manager, ICON_C can be presented and when Julie views media 191 within a file manager ICON_B can be presented.

In one instance, candidate filenames 196 can be persisted within a repository associated with media 191. In the instance, filenames 196 can be searchable permitting keyword searching on a media file via multiple filenames 196.

Drawings presented herein are for illustrative purposes only and should not be construed to limit the invention in any regard. It should be appreciated that semantic analysis can be performed by one or more external sources. For example, image recognition can be processed by a GOOGLE PICASA application and/or Web service. In one embodiment, the disclosure can leverage one or more biometric sources to determine semantic metadata associated with semantic media 191. It should be appreciated that engine 190 can be similar or identical to a naming engine 320.

Figure 2:
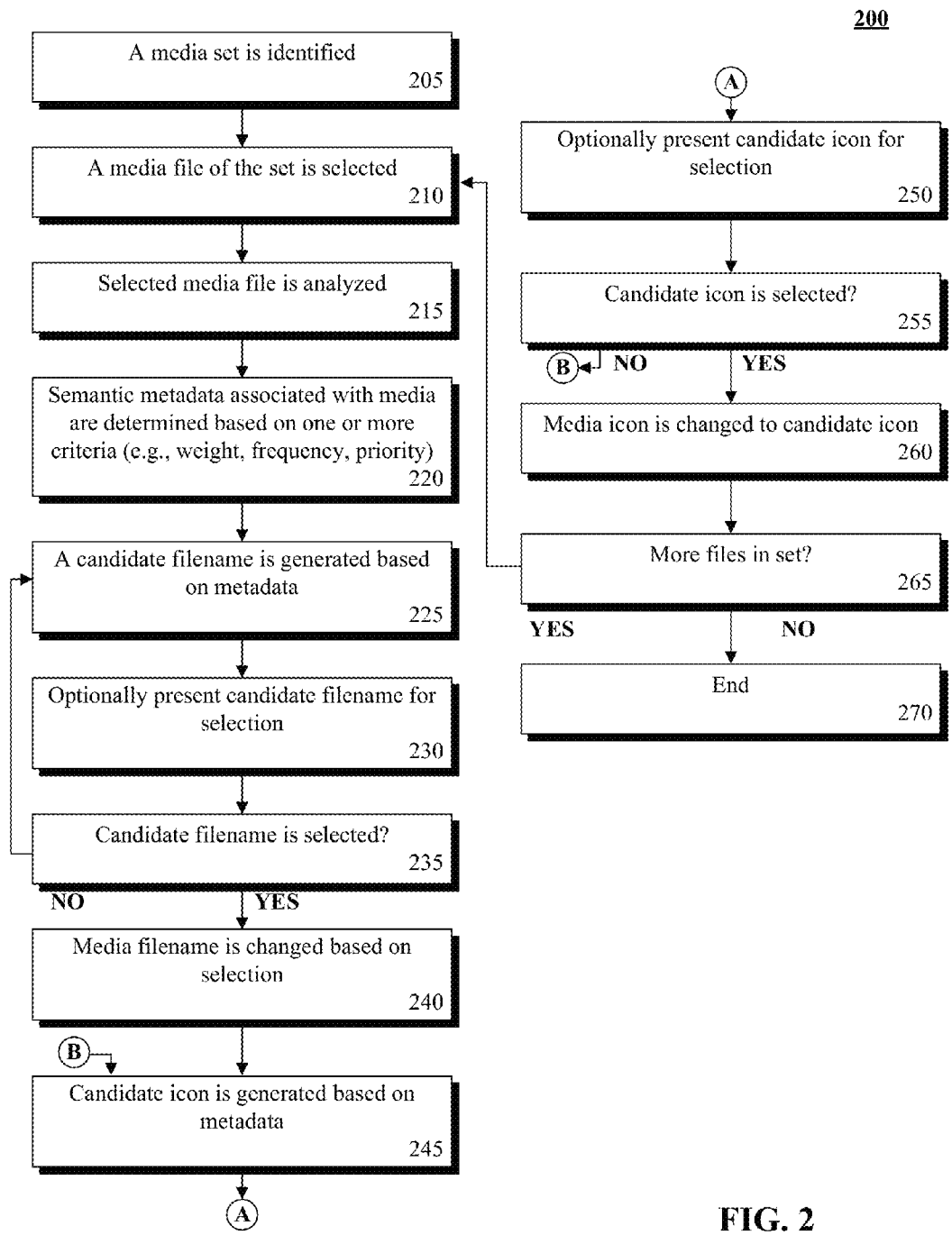
FIG. 2 is a flowchart illustrating a method for enabling intelligent media naming and icon generation utilizing semantic metadata in accordance with an embodiment of the inventive arrangements disclosed herein.

FIG. 2 is a flowchart illustrating a method 200 for enabling intelligent media naming and icon generation utilizing semantic metadata in accordance with an embodiment of the inventive arrangements disclosed herein. Method 200 can be present in the context of scenario 110, 150, 180, system 300, embodiment 410, 420, diagram 510, and/or interfaces 610, 630. In method 200, a media set can be semantically enhanced to improve media searchability and/or identification. Method 200 can be performed in real-time and/or near real-time.

In step 205, a media set can be identified. Media set can be automatically and/or manually identified. Media set can include, but is not limited to, a collection, a slideshow, a grouping, a user selection, and the like. For example, media set can be identified by a user selection within a file manager. In step 210, a media file of the set can be selected. Selection can include an ordered selection and/or a random selection. For example, selection can be alphabetical or by date (e.g., most recent). In step 215, the selected media can be analyzed. Analysis can include one or more traditional and/or proprietary techniques. In one embodiment, analysis can include a semantic analysis to determine a selected media content and/or significance. In the embodiment, analysis can include, but is not limited to, linguistic analysis, semantic structure analysis, and the like.

In step 220, semantic metadata associated with the media can be determined based on one or more attributes. In step 225, a candidate filename or a list can be generated based on the metadata. The candidate filename or a list can be generated based on one or more rules which can include, user established preferences, automatically determined settings, and the like. In step 230, the candidate filename or a list can be optionally presented for selection. Presentation can include a user interface which can permit user selection of the candidate filename. For example, a pop-up dialog box can be presented to confirm the candidate filename selection. In step 235, if the candidate filename is selected (manually through step 230 or automatically without step 230), the method can continue to step 240, else return to step 225 to regenerate. In one contemplated embodiment, an optional step is processed to learn user preference based on a selection (or a default value, if no selection is made). When this step is utilized, the user preference is utilized in the method/process.

In step 240, media filename can be changed based on the candidate selection. In step 245, a candidate icon or a list can be generated based on the metadata. In one instance, the candidate icon can be selected from an existing set of icons (e.g., database of icons). In another instance, metadata can be utilized to generate a customized icon for the media. Icon generation can be performed utilizing one or more traditional and/or proprietary image generation tools. In step 250, the candidate icon or a list can be optionally presented for selection. In one instance, selection can include a preview of candidate icon which can enable a user to view the icon. In step 255, if the candidate icon is selected (manually through step 250 or automatically without step 250), the method can continue to step 260, else return to step 245 to regenerate. In one embodiment, user preference(s) can be determined (based on user selection, a user profile, defaults, or other criteria) and utilized, herein. In step 260, the media icon can be changed to the candidate icon based on the selection. In step 265, if there are more files in the set, the method can continue to step 270, else return to step 210. In step 270, the method can end.

It should be appreciated that filename collision detection and/or resolution can be performed within the method 200. Collision detection and/or resolution can be performed utilizing one or more traditional and/or proprietary techniques.

Drawings presented herein are for illustrative purposes only and should not be construed to limit the invention in any regard. Method 200 can include one or more optional steps which can be omitted permitting the functionality of method 200 is retained. For example, a learning step can be implemented to learn/determine user preferences. Steps 210-265 can be repeated for each file within the media set. Steps 225-235 can be iteratively repeated to improve candidate filename generation. Steps 245-255 can be iteratively repeated to improve candidate icon generation. It should be appreciated that candidate filename and/or icon can be automatically determined utilizing heuristic mechanisms.

Figure 3:
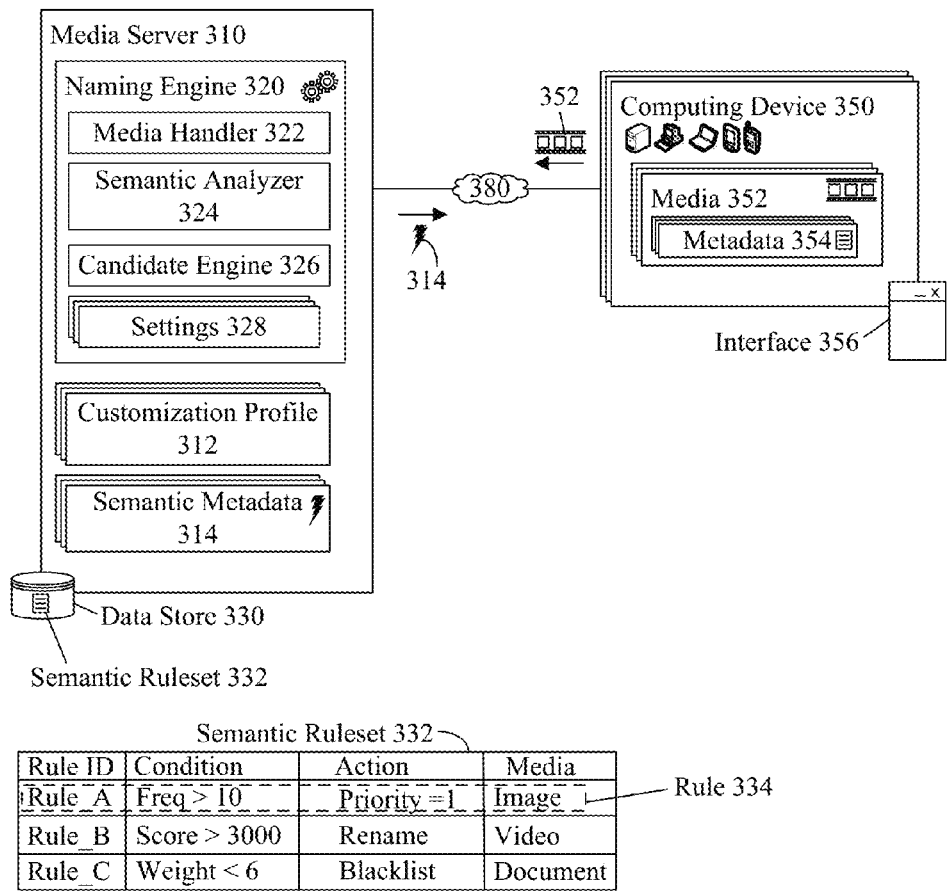
FIG. 3 is a schematic diagram illustrating a system for enabling intelligent media naming and icon generation utilizing semantic metadata in accordance with an embodiment of the inventive arrangements disclosed herein.

FIG. 3 is a schematic diagram illustrating a system 300 for enabling intelligent media naming and icon generation utilizing semantic metadata in accordance with an embodiment of the inventive arrangements disclosed herein. System 300 can be present in the context of scenario 110, 150, 180, method 200, embodiment 410, 420, diagram 510, and/or interfaces 610, 630. In system 300, a naming engine 320 can permit media 352 to be appropriately named utilizing semantic metadata 314 obtained from the media 352. In one instance, metadata 354 can be conveyed to engine 320 which can be utilized to generate metadata 314 which can be communicated to device 350. System 300 can be communicatively linked via one or more networks 380.

Media sever 310 can be a hardware/software entity able to execute naming engine 320. Media server 310 functionality can include, but is not limited to, authentication, encryption, communication, media management, registration of external/alternate components, and the like. Media server 310 can include, but is not limited naming engine 320, customization profile 312, semantic metadata 314, data store 330, and the like. In one embodiment, media server 310 can be a component of a home media server. In another embodiment, media server 310 can be a functionality of a portable media device. In one embodiment, server 310 can be a drop-in replacement for an existing media server.

Naming engine 320 can be a hardware/software element configured to intelligently name media 352. Engine 320 functionality can include, but is not limited to, media 352 conversion, media 352 compression, registration of media, and the like. Engine 320 can include, but is not limited to, media handler 322, semantic analyzer 324, candidate engine 326, settings 328, and the like. In one embodiment, engine 320 functionality can be present within an Application Programming Interface (API). In another embodiment, engine 320 functionality can be present within a Web-based service. In yet another instance, engine 320 can be a functionality of a networked computing element. It should be appreciated that engine 320 can include additional components such as a profiler, an algorithm selection component, and the like. In one embodiment, engine 320 can be configured to enable content mining and analysis by leveraging services in the cloud. In one embodiment, functionality of engine 320 can be present within a plug-in.

Media handler 322 can be a hardware/software entity able to manage media 352, metadata 354, and/or semantic metadata 314. Handler 322 functionality can include, but is not limited to, media 352 identification, media 352 selection, media 352 specific operations (e.g., encode, decode), and the like. Handler 322 can communicate with computing device 350 to obtain media 352 and/or metadata 354. In one embodiment, handler 322 can add, modify, and/or delete metadata 354 and/or semantic data 314.

Semantic analyzer 324 can be a hardware/software element configured to determine semantic metadata 314 associated with media 352. Analyzer 324 functionality can include, but is not limited to, media 352 analysis, metadata 354 analysis, semantic metadata analysis 314, attribute evaluation, and the like. Analyzer 324 can include voice recognition, image recognition, a text analysis (e.g., lexical analysis), event recognition, object recognition, and the like. In one embodiment, incorrect metadata 314 can be excluded during analysis using traditional and/or proprietary noise cancellation techniques. In one instance, analyzer 324 can be utilized to compute a score for keywords (e.g., metadata 314, metadata 354) associated with the media 352. In the instance, score can be associated with a threshold value, a rank, and the like. It should be appreciated that the threshold value can be a user established value, an automatically determined value, and the like. Score can be a result of a simple mathematical computation, a statistical computation, and the like.

Candidate engine 326 can be a hardware/software able to determine one or more candidate filenames and/or icons for media 352. Engine 326 functionality can include, but is not limited to, candidate filename generation, candidate filename selection, candidate icon generation, candidate icon selection, and the like. In one embodiment, engine 326 can utilize traditional and/or proprietary heuristics to enable the engine 326 to iteratively improve candidate generation and/or selection.

Settings 328 can be one or more configuration options for establishing the behavior of system 300, server 310, and/or engine 320. Settings 328 can include, but is not limited to, handler 322 options, analyzer 324 settings, engine 326 options, and the like. Settings 328 can be manually and/or automatically established. In one instance, settings 328 can be presented within a user interface including, but not limited to, media server 310 interface (not shown), interface 356, and the like.

Customization profile 312 can be one or more user established settings for generating metadata 314, candidate filenames, candidate icons, and the like. Profile 312 can be established based on historic selections of candidate filenames/icons, historic settings, and the like. In one instance, profile 312 can include a whitelist, a blacklist, and the like. For example, a blacklist can include a set of keywords and persons to ignore during semantic analysis. In one embodiment, profile 312 can be utilized to refine the accuracy functionality of engine 320. In one instance, profile 312 can include user accounts which can be utilized as external data sources to enhance content mining algorithms. Profile 312 can support a LINKEDIN profile (e.g., account information), a FACBOOK profile, TWITTER profile, a custom database information, and the like.

Semantic metadata 314 can be one or more data sets associated with media 352. In one instance, metadata 314 can include, a keyword (e.g., tag), an attribute, a category and the like. Metadata 314 can be persisted within data store 330, a metadata repository, and the like. In one instance, metadata 314 can conform to an Extensible Markup Language, a comma delimited value format, and the like. For example, metadata 314 can conform to a name value pairing. In one instance, semantic metadata 314 can be associated with metadata 354. For example, a location metadata (e.g., GPS location) can be associated with the name of an event (e.g., first bike ride). That is, metadata 354 can be imbued with meaning utilizing keywords, attributes, and the like.

Data store 330 can be a hardware/software component able to persist profile 312, metadata 314, media 352, ruleset 332, and the like. Data store 330 can be a Storage Area Network (SAN), Network Attached Storage (NAS), and the like. Data store 330 can conform to a relational database management system (RDBMS), object oriented database management system (OODBMS), and the like. Data store 330 can be communicatively linked to server 310 in one or more traditional and/or proprietary mechanisms. In one instance, data store 330 can be a component of Structured Query Language (SQL) complaint database.

Semantic ruleset 332 can be one or more rules for creating and/or managing semantic metadata 314. Ruleset 332 can include, but is not limited to, a rule, a rule identifier, a media type, a metadata, a metadata identifier, a comment, a date/time, a permission, and the like. Rule 334 can include, but is not limited to, a condition, a permission, an action, and the like. For example, rule 334 can trigger a keyword to be set to priority of one when the frequency is above ten. In one embodiment, ruleset 332 can be persisted within data store 330, device 350, and the like. In one instance, ruleset 332 can be heuristically determined utilizing historic rules. It should be appreciated that ruleset 332, rules 334 can be arbitrarily complex.

Computing device 350 can be a hardware/software associated with media 352 and/or interface 356. Device 350 can include, but is not limited to, media 352, interface 356, and the like. Computing device 350 can include, but is not limited to, a desktop computer, a laptop computer, a tablet computing device, a PDA, a mobile phone, and the like. Computing device 350 can be communicatively linked with interface 356. In one instance, interface 356 can present profile 312, ruleset 332, media 352, metadata 354, and the like.

Media 352 can be a digital content associated with a metadata 354. Media 352 can include digitally rights managed (DRM) protected content, unprotected content, and the like. Media 352 can include proprietary and/or traditional formats. Media 352 formats can include, but is not limited to, a text file, a rich text file (RTF), an OPENDOCUMENT, a Joint Photographic Experts Group (JPEG), a Portable Network Graphics (PNG), a Graphics Interchange Format (GIF), Moving Picture Experts Group (MPEG), Audio Video Interleave (AVI), a Portable Document Format (PDF), and the like.

Interface 356 can be a user interactive component permitting interaction and/or presentation of media 352, metadata 354, profile 312, and/or metadata 314. In one embodiment, interface 356 can permit the manual management of semantic metadata 314. For example, a system administrator can add or remove keywords which can improve semantic filename creation. In one embodiment, the interface 356 can be utilized via a device to approve the metadata changes being proposed for filenames and icons. Interface 356 can be present within the context of a Web browser application, a media management application, and the like. Interface 356 capabilities can include a graphical user interface (GUI), voice user interface (VUI), mixed-mode interface, and the like. In one instance, interface 356 can be communicatively linked to computing device 350.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), VPN and the like.

Drawings presented herein are for illustrative purposes only and should not be construed to limit the invention in any regard. System 300, server 310, engine 320 can include one or more optional components permitting the functionality of the system 300 is retained. In one embodiment, system 300 can conform to a Service Oriented Architecture (SOA). System 300 can be a distributed computing environment, networked computing environment, and the like.

Figure 4:
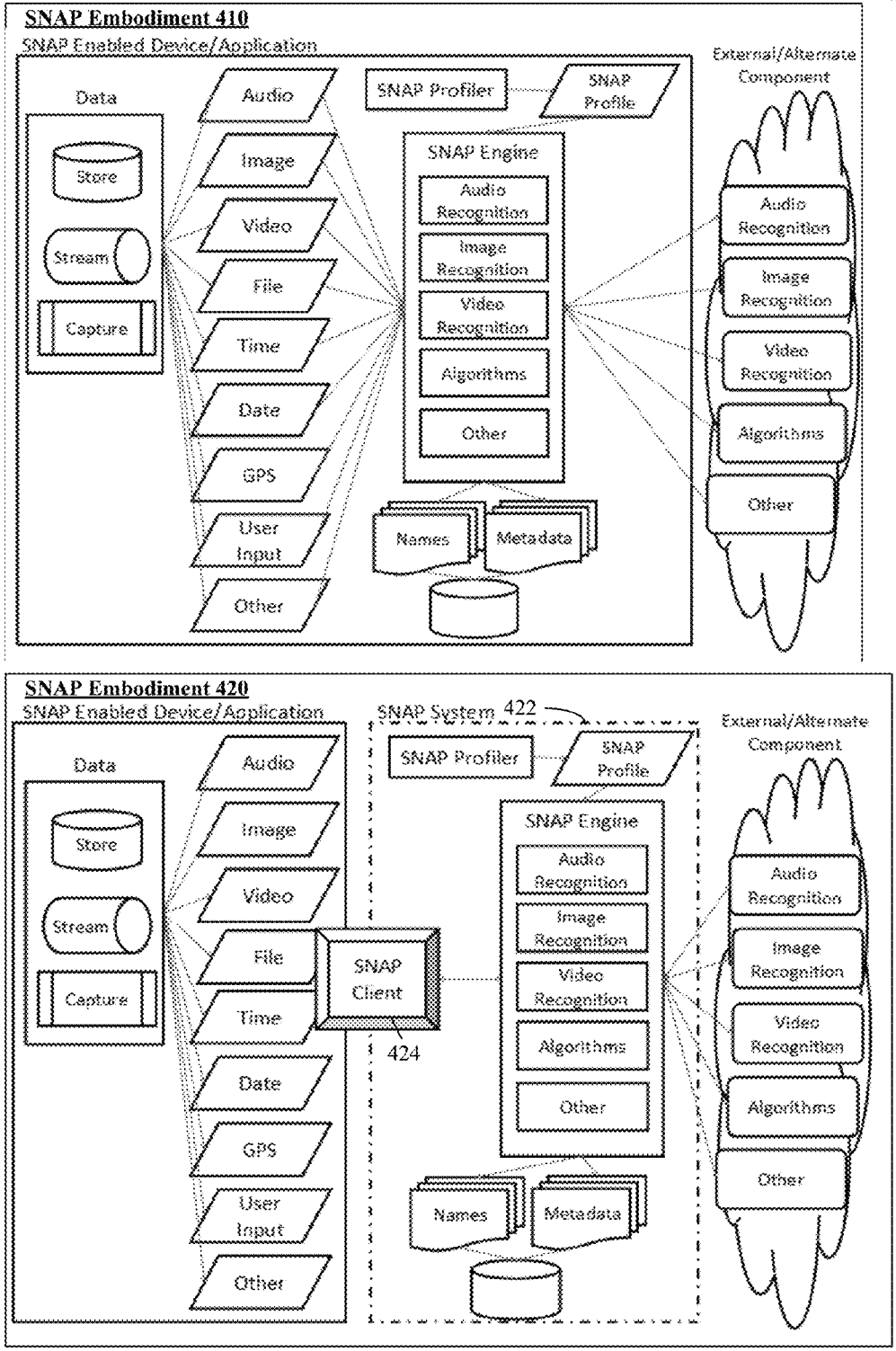
FIG. 4 is a schematic diagram illustrating a set of embodiments for enabling intelligent media naming and icon generation utilizing semantic metadata in accordance with an embodiment of the inventive arrangements disclosed herein.

FIG. 4 is a schematic diagram illustrating a set of embodiments 410, 420 for enabling intelligent media naming and icon generation utilizing semantic metadata in accordance with an embodiment of the inventive arrangements disclosed herein. Embodiment 410, 420 can be present in the context of scenario 110, 150, 180, method 200, system 300, diagram 510, and/or interfaces 610, 630. Embodiment 410, 420, define a Smart Naming and Analyzing Process (SNAP) architecture to enable the functionality disclosed herein.

In embodiment 410, a SNAP-enabled device/application can acquire media content and metadata such as GPS and time/date information. The media content and metadata can be conveyed to an internal SNAP Client which can send the information to a SNAP Engine (e.g., naming engine 320). The data can be sent in a streaming fashion for real time processing or a bulk fashion for post-processing. The SNAP Engine can process the media content and semantic metadata to generate names, keywords (e.g., tags), and additional semantic metadata. It should be appreciated that not all components presented can be implemented within the SNAP Engine. Functionality of components such as semantic analysis, audio recognition, image recognition, and the like can be externalized to external/alternate components. For example, components can include services such as SHAZAM and/or PICASA. It should be appreciated that alternate components can be selected instead of any built-in components through a SNAP Profiler.

In embodiment 420, a SNAP-enabled device/application can include a SNAP client 424 which can be communicatively linked to a SNAP system 422. Operation of embodiment 420 can conform to client-server communication. SNAP system 422 include be linked to external/alternate components which can perform semantic analysis, image recognition, audio recognition, and the like.

Drawings presented herein are for illustrative purposes only and should not be construed to limit the invention in any regard. Embodiment 410, 420 architecture can include peer-to-peer architecture, a distributed architecture, and the like.

Figure 5:
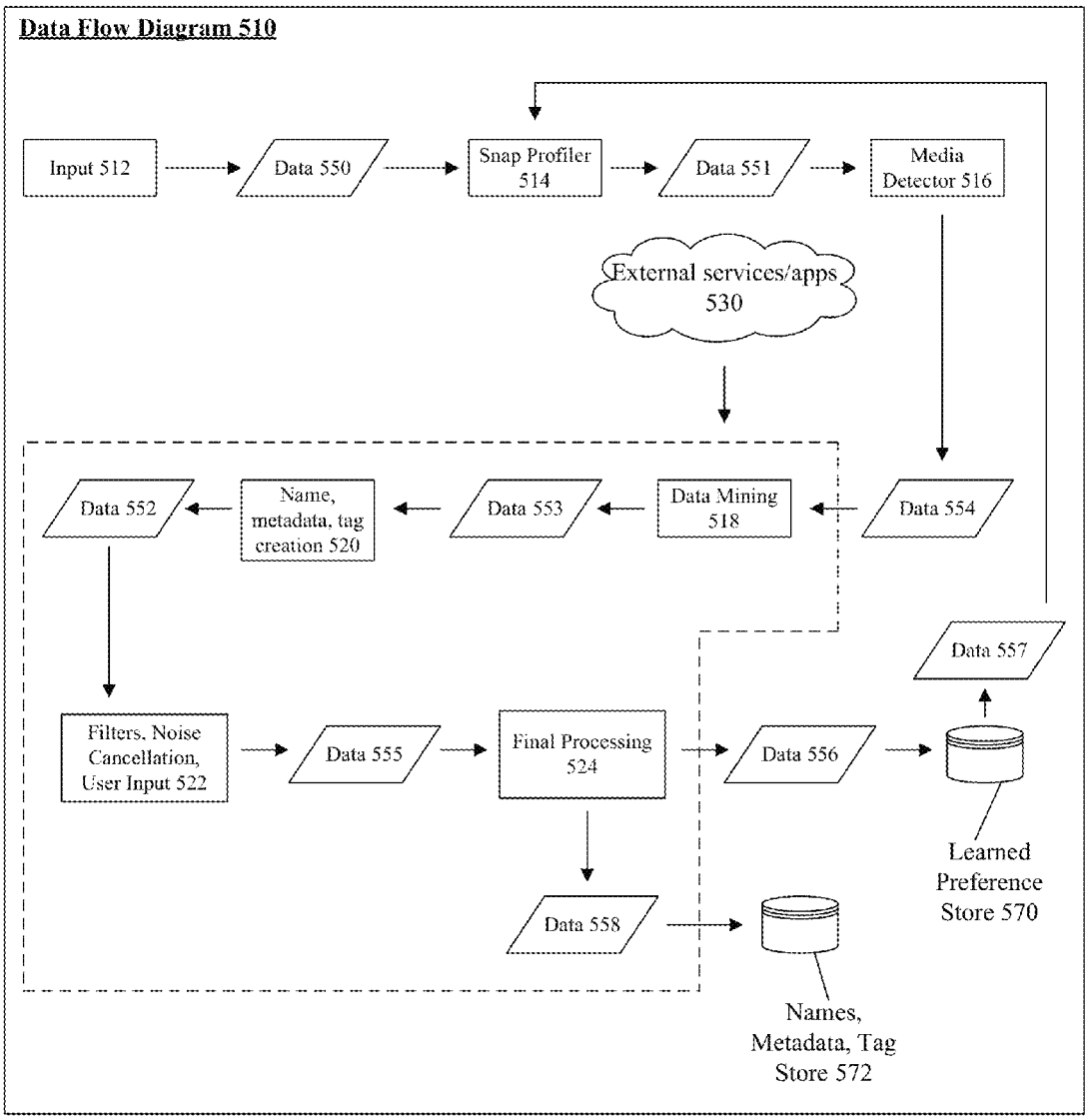
FIG. 5 is a schematic diagram illustrating a data flow diagram for enabling intelligent media naming and icon generation utilizing semantic metadata in accordance with an embodiment of the inventive arrangements disclosed herein.

FIG. 5 is a schematic diagram illustrating a data flow diagram 510 for enabling intelligent media naming and icon generation utilizing semantic metadata in accordance with an embodiment of the inventive arrangements disclosed herein. Diagram 510 can be present in the context of scenario 110, 150, 180, method 200, system 300, and/or embodiment 410, 420, and/or interfaces 610, 630. Diagram 510 can include components/actions 512-524, data 550-558, data store 570, 572 and/or external components 530.

In diagram 510, media content can be acquired using a SNAP-enabled device/application with device/application supported metadata such as GPS, date, and time. Data from the acquisition can be augmented with user preferences and user configurations from the SNAP profiler 514 to control the behavior and outcome of various SNAP engine components. Data from the profiler can be augmented with algorithm selections determined by the media detector based on media content, metadata, semantic metadata, user preferences, and user configurations. The media detector 516 can be an optional component for a SNAP enabled device/application which can support multiple media types in order to appropriately select algorithms to be used during data mining of the media content. Data from the previous step can be augmented with data mined from the media content and semantic metadata based on selected algorithms, user preferences, and user configurations from SNAP profiler 514. The data mining component 518 can be built into the SNAP engine or externalized. The selected data mining algorithms can be selected and configured by the user through the SNAP profiler. Data from the previous step can be augmented with generated names and semantic metadata (e.g., tags, attributes) using selected algorithms, user preferences, and user configurations. The algorithms for generating names and semantic metadata (e.g., tags, attributes) can be configurable by the user through the SNAP profiler allowing for weighting, length limitations, and other configurations. Data from the previous step which include redundant and/or meaningless names and semantic metadata (e.g., tags) can be removed. Removal can be based on user preferences, user configurations, user direct input, and learned past user behavior. New user preferences, likes/dislikes, new user configurations, and learned user behavior can be extracted by the final processing component 524 and stored in the database. Newly generated names, keywords (e.g., tags), and semantic metadata (e.g., attributes) for the processed content can be extracted by the final processing component 524 and stored in the database. User preferences, likes/dislikes, and user behavior stored in the database can be utilized by SNAP profiler 514 for future use.

Figure 6:
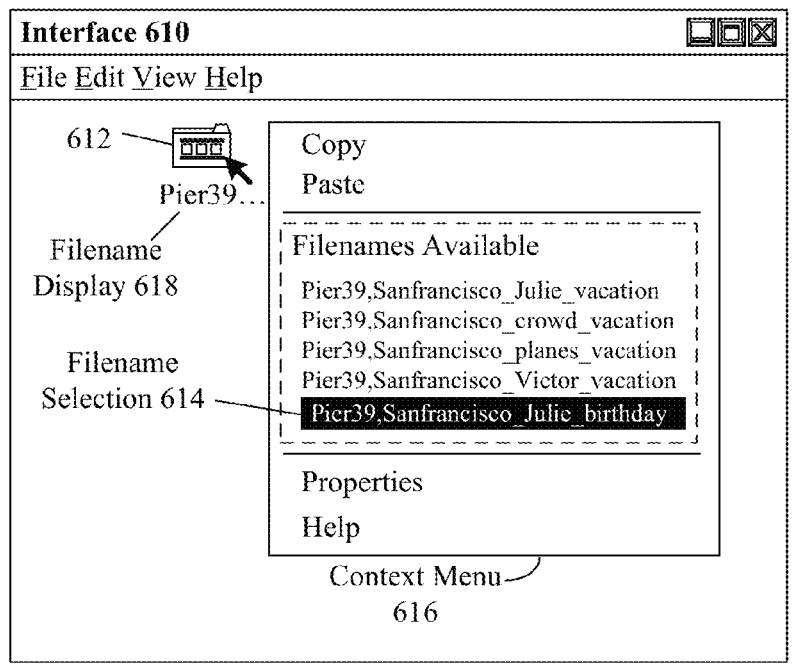
FIG. 6 is a schematic diagram illustrating a set of interfaces for enabling intelligent media naming and icon generation utilizing semantic metadata in accordance with an embodiment of the inventive arrangements disclosed herein.
Figure 6:
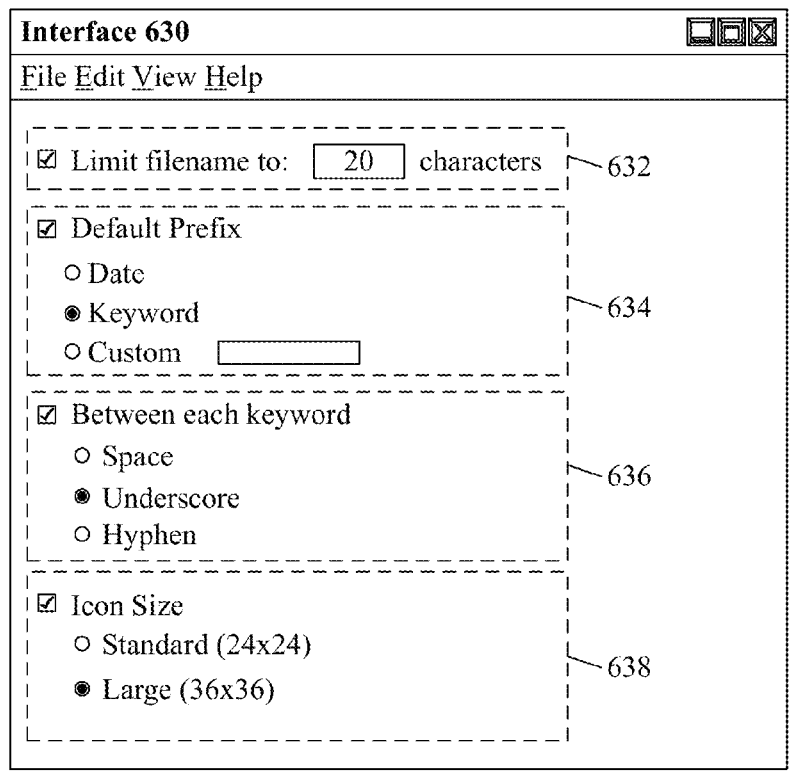

FIG. 6 is a schematic diagram illustrating a set of interfaces 610, 630 for enabling intelligent media naming and icon generation utilizing semantic metadata in accordance with an embodiment of the inventive arrangements disclosed herein. Interfaces 610, 630 can be present in the context of scenario 110, 150, 180, method 200, system 300, embodiment 410, 420, and/or diagram 510. Interfaces 610, 630 can be present in the context of an administrative interface, a settings interface, and the like. In interface 610, a context menu 616 can present a file selection 614 action for a media 612. In interface 630, options 632-638 can permit customized semantic filename and/or icon generation.

In interface 610, a media 612 can be presented within an operating system of a computing device. Media 612 can be selectable permitting a context menu to be presented upon selection of media 612. In one instance, menu 616 can include a filename selection 614 action enabling dynamic selection of filename display 618. In the instance, candidate filenames for a media 612 can be presented within a context menu 616. For example, right clicking on media 612 can present selection 616 allowing filename display to change from "Pier39,SanFranciso_Julie_vacation" to "Pier39,SanFranciso_Julie_birthday". It should be appreciated that filename selection 614 can be present within a pull down menu, an options interface (e.g., media properties dialog), and the like. It should be appreciated that icon selection can be achieved utilizing a similar selection 614 mechanism.

In interface 630, options 632-638 can permit the configuration of filename/icon generation. Option 632 can allow limitations on filename length to be applied to candidate filenames to facilitate file system restrictions, file naming rules, and the like. For example, option 632 can restrict filename length to be limited to twenty characters. In option 634, default prefixes for candidate filenames can be selected based on user selection. In one instance, option 634 can permit filename prefixes to begin with a date, a keyword (e.g., semantic metadata), a custom keyword, and the like. Option 636 can permit the configuration of filename concatenation. For example, keywords for filenames can be concatenated with a space, an underscore, or a hyphen. Option 638 can be utilized to determine the size of generated icons. For example, option 638 can permit standard and large size icons to be created. It should be appreciated that interface 630 can include additional options which can affect filename and/or icon generation.

Drawings presented herein are for illustrative purposes only and should not be construed to limit the invention in any regard. Interface 610, 630 can present interface elements including, but not limited to, a text box, a checkbox, a radio button, and the like. Interface 610, 630 can be present within a file manager, a media management application, and the like.

The flowchart and block diagrams in the FIGS. 1-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for intelligent media naming comprising:
a computing device, comprising hardware and software that the hardware executes, identifying a plurality of media files within a data store, each of the media files lacking user established file names;
the computing device analyzing the plurality of media files for images to automatically recognize faces within image content of the media files using a facial recognition program;
the computing device analyzing the plurality of media files for audio to automatically recognize voices within audio content of the media files using a speaker identification recognition or speaker identify verification program;
the computing device based upon the recognized faces and voices generating a plurality of different content identification keywords for naming the media files, wherein the content identification keywords vary based on identities of humans with the recognized faces and voices;
the computing device establishing a filename prefix for the media files using scored and ranked content identification keywords;
for at least a subset of the media files with a common filename prefix, automatically determining a filename suffix for the subset of media files and automatically concatenating the filename prefix and a filename suffix to create a unique file name for each of the subset of the media files;
automatically generating a unique file name for each of the media files using semantic metadata, wherein each unique file name includes the established filename prefix, and wherein for the subset of media files the unique file names includes the concatenation of the established filename prefix and the unique filename suffix.

2. The method of claim 1, further comprising:
the computing device computing frequency or predominance of appearance in the media files of humans using the recognized faces and voices, computing relationships between humans having recognized faces and voices, and utilizing results of the computing to score and rank the content identification keywords in order of significance.

3. The method of claim 1, wherein each of the media files is a user taken video, wherein the computing device is a digital camera, a video recorder, or mobile phone, said computing device comprising a camera and a memory, wherein the camera captures environmental input used to create the media files, and wherein the memory stores the media files.

4. The method of claim 1, wherein the computing device is a set of one or more servers linked to a network, wherein the one or more servers permit users to upload and view the media files, wherein the set of one or more servers provide an option for automatically renaming uploaded media files per the method.

5. A method for intelligent media naming comprising:
a computing device, comprising hardware and software that the hardware executes, identifying a plurality of media files within a data store, each of the media files lacking user established file names;
the computing device analyzing the plurality of media files to automatically recognize faces and voices within content of the media files;
the computing device based upon the recognized faces generating a plurality of different content identification keywords for naming the media files, wherein the content identification keywords vary based on identifies of humans with the recognized faces;
the computing device establishing a filename prefix for the media files using scored and ranked content identification keywords;
for at least a subset of the media files with a common filename prefix, automatically determining a filename suffix for the subset of media files and automatically concatenating the filename prefix and a filename suffix to create a unique file name for each of the subset of the media files; and
automatically generating a unique file name for each of the media files using semantic metadata, wherein each unique file name includes the established filename prefix, and wherein for the subset of media files the unique file names includes the concatenation of the established filename prefix and the unique filename suffix.

6. The method of claim 5, further comprising:
the computing device computing frequency or predominance of appearance in the media files of the recognized faces, relationships between the recognized faces, and identity based prioritization values based on the recognized facts to score and rank the content identification keywords in order of significance.

7. The method of claim 5, wherein each of the media files is a user taken photograph or user taken video, wherein the computing device is a digital camera, a video recorder, or mobile phone, said computing device comprising a camera and a memory, wherein the camera captures environmental input used to create the media files, and wherein the memory stores the media files.

8. The method of claim 5, wherein the computing device is a set of one or more servers linked to a network, wherein the one or more servers permit users to upload and view the media files, wherein the set of one or more servers provide an option for automatically renaming uploaded media files utilizing semantic metadata.

9. The method of claim 5, further comprising;
automatically generating an icon for each of the media files, wherein the icons generated for the media files vary from each other depending on the automatically recognized faces contained within.

10. The method of claim 5, wherein the media files are digital images.

11. The method of claim 5, wherein the media files are digital home videos.

12. The method of claim 5, wherein the plurality of media files comprise one or more file types from a group of file types comprising an image file type, a video file type, an audio file type, and a document file.

13. The method of claim 5, wherein the analyzing determines an identity of a human facially recognized in the corresponding one of the subset of media files, wherein a file name that includes a name of the identified human is generated for the corresponding media file.

14. The method of claim 5, further comprising:
the computing device analyzing the plurality of media files for audio to automatically recognize voices within audio content of the media files using a speaker identification recognition or speaker identity verification program, wherein the scoring of the content identification keywords is adjusted based on identifies of recognized voices in corresponding ones of the media files.

15. A method for intelligent media naming comprising:
a computing device, comprising hardware and software that the hardware executes, identifying a plurality of media files within a data store, each of the media files lacking user established file names;
the computing device analyzing the plurality of media files for audio to automatically recognize voices within audio content of the media files using a speaker recognition or speaker identity verification program;
the computing device based upon the recognized voices generating a plurality of different content identification keywords for naming the media files, wherein the content identification keywords vary based on identities of humans with the recognized voices;
the computing device establishing a filename prefix for the media files using scored and ranked content identification keywords;
for at least a subset of the media files with a common filename prefix, automatically determining a filename suffix for the subset of media files and automatically concatenating the filename prefix and a filename suffix to create a unique file name for each of the subset of the media files; and
automatically generating a unique file name for each of the media files using semantic metadata, wherein each unique file name includes the established filename prefix, and wherein for the subset of media files the unique file names includes the concatenation of the established filename prefix and the unique filename suffix.

16. The method of claim 15, further comprising:
the computing device computing frequency or predominance of appearance in the media files of humans based on the recognized voices, computing relationships between humans having the recognized voices, and utilizing results of the computing to score and rank the content identification keywords in order of significance.

17. The method of claim 15, wherein each of the media files is a user taken video or user taken audio recording, wherein the computing device is a digital camera, a video recorder, or mobile phone, said computing device comprising a camera and a memory, wherein the camera captures environmental input used to create the media files, and wherein the memory stores the media files.

18. The method of claim 15, wherein the computing device is a set of one or more servers linked to a network, wherein the one or more servers permit users to upload and view the media files, wherein the set of one or more servers provide an option for automatically renaming uploaded media files per the method.

19. The method of claim 15, wherein the plurality of media files comprise one or more file types from a group of file types comprising an image file type, a video file type, an audio file type, and a document file.

20. The method of claim 15, wherein the analyzing determines an identity of a human facially recognized in the corresponding one of the subset of media files, wherein a file name that includes a name of the identified human is generated for the corresponding media file.

* * * * *